United States Patent
Sun et al.

(10) Patent No.: US 11,279,869 B2
(45) Date of Patent: Mar. 22, 2022

(54) FLUIDS FOR APPLICATIONS IN DOWNHOLE TOOLS

(71) Applicant: Halliburton Energy Services, Inc., Houston, TX (US)

(72) Inventors: Hong Sun, Houston, TX (US); Janette Cortez Montalvo, Porter, TX (US); Linping Ke, The Woodlands, TX (US); Syed Muhammad Farrukh Hamza, Tomball, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 190 days.

(21) Appl. No.: 16/724,540

(22) Filed: Dec. 23, 2019

(65) Prior Publication Data

US 2021/0189225 A1    Jun. 24, 2021

(51) Int. Cl.
*E21B 43/16* (2006.01)
*C09K 8/72* (2006.01)
*E21B 7/06* (2006.01)

(52) U.S. Cl.
CPC .............. *C09K 8/725* (2013.01); *E21B 7/065* (2013.01); *E21B 43/162* (2013.01)

(58) Field of Classification Search
CPC ......... C09K 8/725; E21B 7/065; E21B 4/162; E21B 43/16; E21B 46/13; E21B 43/26
See application file for complete search history.

(56) References Cited

U.S. PATENT DOCUMENTS

| 4,291,765 | A   |   | 9/1981  | Gilchrist et al. |
|-----------|-----|---|---------|------------------|
| 4,293,427 | A   |   | 10/1981 | Lucas et al.     |
| 5,637,556 | A   |   | 6/1997  | Argillier et al. |
| 7,207,387 | B2  | * | 4/2007  | Eoff ........................ C09K 8/40 166/291 |
| 2014/0000897 | A1 | * | 1/2014  | Wang ..................... C09K 8/706 166/300 |
| 2016/0272876 | A1 | * | 9/2016  | Barreto ................. E21B 43/267 |
| 2017/0292359 | A1 | * | 10/2017 | Irani ....................... E21B 49/10 |
| 2018/0148635 | A1 |   | 5/2018  | Shen et al. |
| 2018/0291256 | A1 | * | 10/2018 | Alwattari ................. C09K 8/86 |
| 2019/0153860 | A1 |   | 5/2019  | Khan et al. |
| 2019/0185740 | A1 |   | 6/2019  | Jung et al. |

FOREIGN PATENT DOCUMENTS

WO   WO 2018/022079 A1   2/2018

OTHER PUBLICATIONS

International Search Report and Written Opinion issued by the Korean Intellectual Property Office for International Application No. PCT/US2019/068276 dated Sep. 18, 2020. (11 pages).

* cited by examiner

*Primary Examiner* — Silvana C Runyan
(74) *Attorney, Agent, or Firm* — Haynes and Boone, LLP

(57) ABSTRACT

A method of servicing a wellbore includes introducing a fluid into a wellbore, the wellbore having particulate matter disposed therein and entraining at least a portion of the particulate matter within the fluid. The fluid includes a polymer having at least one hydrophobic monomer and at least one hydrophilic monomer. The fluid is also included within an analytical tool within a coiled tubing system for performing operations in a wellbore. The fluid is also included within a formation-tester tool.

17 Claims, 11 Drawing Sheets

FLUIDS FOR APPLICATIONS IN DOWNHOLE TOOLS

TECHNICAL FIELD

The present disclosure relates generally to fluids useful in operations related to subterranean wellbores, e.g., wellbores employed for oil and gas exploration, drilling and production. More particularly, embodiments of the disclosure relate to fluids that may be used in wellbore interventions and wellbore formation evaluations.

BACKGROUND

In operations related to the production of hydrocarbons from subterranean geologic formations, coiled tubing may be used in a variety of wellbore servicing operations including drilling operations, completion operations, stimulation operations, workover and other operations. Coiled tubing generally refers to relatively flexible, continuous small diameter cylindrical tubing having a thin wall made of metal or composite material that can be run into the wellbore from a large spool which may be mounted on a truck or other support structure. Coiled tubing may be used, for example, to inject gas or other fluids into the wellbore or pipeline, to inflate or activate bridges and packers, to transport tools downhole (such as logging tools or a formation tester), to perform remedial cementing and clean-out operations in the bore, to deliver drilling tools downhole, for electric wireline logging and perforating, drilling, wellbore cleanout, fishing, setting and retrieving tools, for displacing fluids, and for transmitting hydraulic power into the wellbore. The flexible, lightweight nature of coiled tubing makes it particularly useful in deviated wellbores. In several coiled tubing operations, a working or service fluid may be required.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which.

DETAILED DESCRIPTION OF THE DISCLOSURE

Generally, a coiled tubing universal connector head has a flow through bore and an electrical and/or optical cable connector that mates with a cable connector of a bottom hole assembly having at least an analytic tool and an intervention tool, thereby permitting traditional wireline measurements and monitoring to be carried out during the same run or trip as wellbore intervention activities. In this regard, the cable connector of the universal connector head mates with a cable connector of a circulating sub. The circulating sub has a flow through bore and a cable connector that mates with a cable connector of the analytic tool. The analytic tool is a wireline sub having a housing with sensors positioned along an inner flow through bore of the housing so that flow can move past the wireline tool when desired. The sensors are electrically and/or optically connected to the cable connector of the analytic tool in order to communicate via a cable extending down through the coiled tubing. Attached below the analytic tool is intervention tool such as a jetting tool for perforating or a drill bit for milling or drilling. The circulating sub has a bypass valve that can port fluid around the analytic tool as desired to avoid subjecting sensors of the analytic tool to certain fluids, such as corrosive fluids or sand slurries that could otherwise damage the wireline sensor. Utilizing a flow through universal connector head and an analytic tool that is incorporated as part of the bottom hole assembly permits the elimination or reduction of multiple wellbore trips for a particular coiled tubing (CT) procedure.

Figure 1:
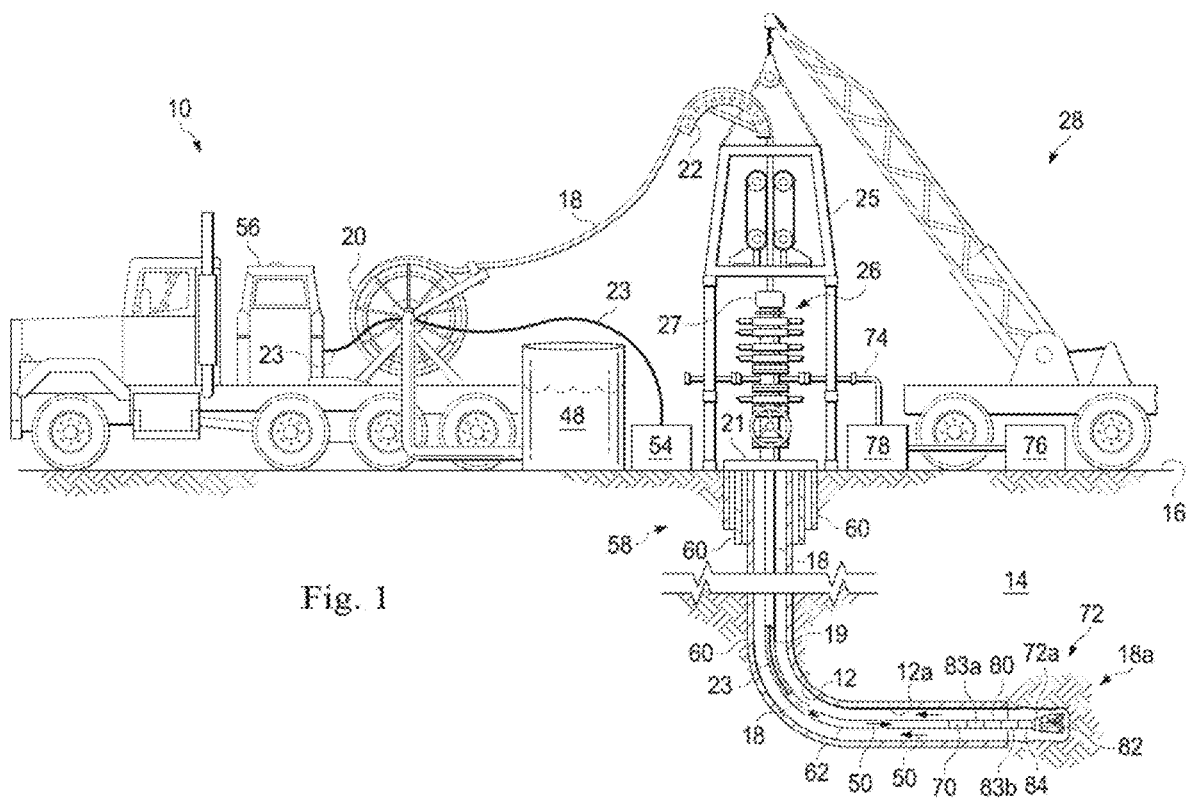
FIG. 1 is an elevation view in partial cross section of a land-based coiled tubing well system with a flow-through, coiled tubing connector head and a bottom hole assembly with a flow-through wireline tool and an intervention tool according to an embodiment.

FIG. 1 is an elevation view in partial cross section of a land-based coiled tubing well system with a flow-through, coiled tubing connector head and a bottom hole assembly with a flow-through wireline tool and an intervention tool according to an embodiment. In particular, a CT drilling and production system 10 is utilized to produce hydrocarbons from wellbore 12 extending through various earth strata in an oil and gas formation 14 located below the earth's surface 16. Wellbore 12 may be formed of a single or multiple bores 12a, 12b, . . . 12n (illustrated in FIG. 2), extending into the formation 14, and disposed in any orientation, such as the horizontal wellbore 12b illustrated in FIG. 2.

CT drilling and production system 10 generally utilizes coiled tubing 18 to conduct various drilling and production operations. Coiled tubing 18 is characterized by a distal end 18a and includes an inner annulus or flowbore 19. The coiled tubing 18 is stored on a spool or reel 20 assembly (e.g., by being wrapped about the reel) positioned adjacent a wellhead 21. A tube guide 22 guides the coiled tubing 18 into an injector 24 supported on a frame assembly 25 and positioned above wellhead 21 and is used to feed and direct the coiled tubing 18 into and out of the wellbore 12. The injector 24 and frame assembly 25 may be suspended by a conventional derrick (not shown) or crane 28. As used herein the term "coiled tubing" will include any continuous or endless pipe string that may be wound on a spool or otherwise deployed rapidly including continuous metal tubulars such as low-alloy carbon-steel tubulars, composite coiled tubulars, capillary tubulars and the like.

The coiled tubing 18 extends through a blowout preventer stack 26 connected to wellhead 21 for pressure control of wellbore 12. Positioned atop the BOP stack 26 is lubricator mechanism or stuffing box 27 which provides the primary operational seal about the outer diameter of the coiled tubing 18 for the retention of any pressure that may be present at or near the surface of the wellbore 12. Although a land-based coiled tubing system is depicted in FIG. 1, coiled tubing 18 can be deployed from floating rigs, jackups, platforms, subsea wellheads, or any other well location.

Figure 2:
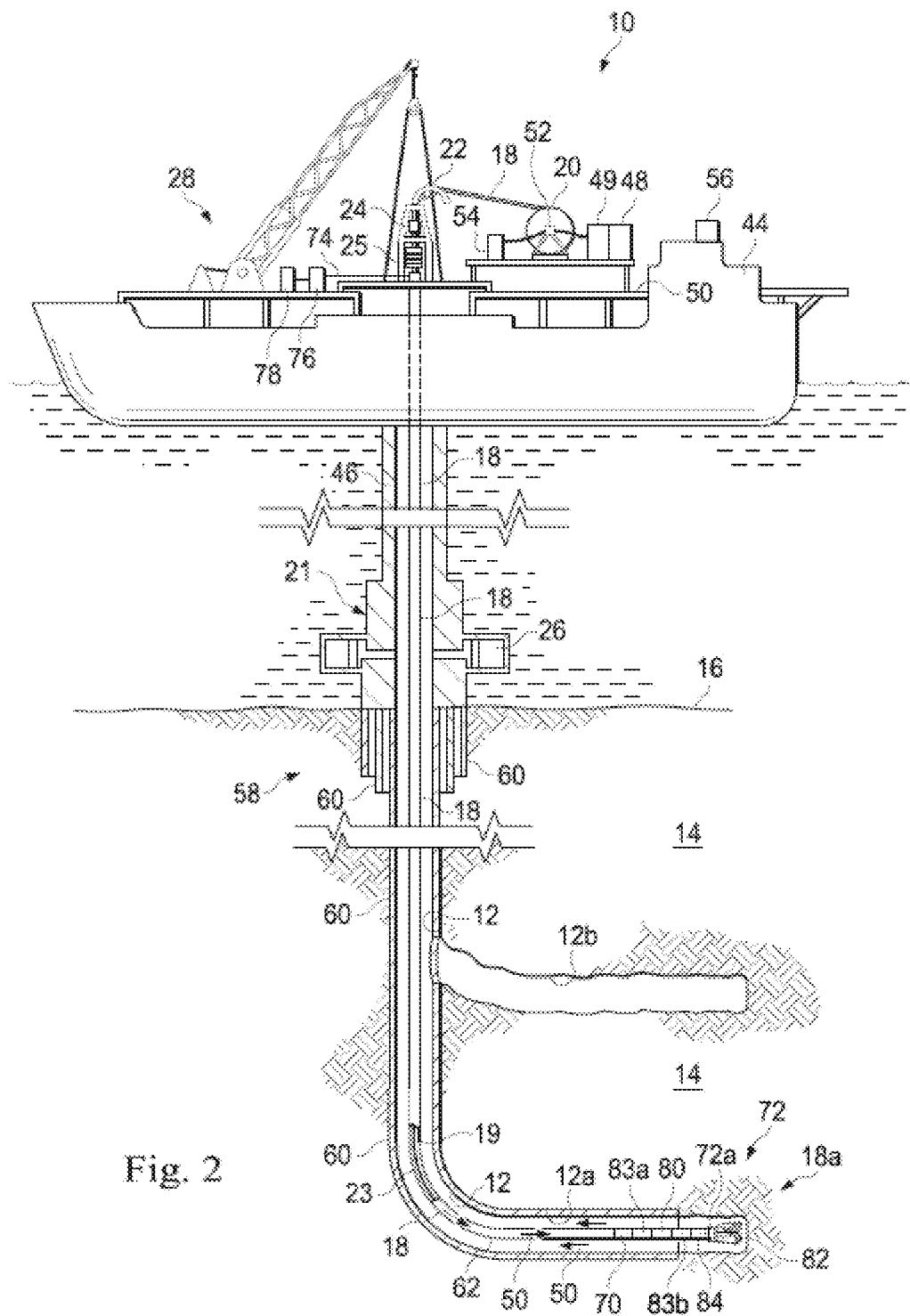
FIG. 2 is an elevation view in partial cross section of a marine-based coiled tubing well system as shown in FIG. 1.

FIG. 2 is an elevation view in partial cross section of a marine-based coiled tubing well system as shown in FIG. 1. Thus, CT drilling and production system 10 may be mounted on an oil or gas platform 44, such as the offshore platform as illustrated, semi-submersibles, drill ships, and the like (not shown). Although system 10 of FIG. 2 is illustrated as being marine-based, system 10 of FIG. 2 may be deployed on land. Likewise, although system 10 of FIG. 1 is illustrated as being land-based, system 10 of FIG. 1 may be deployed offshore. In any event, for marine-based systems, one or more subsea conduits or risers 46 extend from deck 50 of platform 44 to a subsea wellhead 21. Coiled tubing 18 extends down from platform 44, through subsea conduit 46 and BOP 26 into wellbore 12.

A working or service fluid source 48, such as a storage tank or vessel, may supply a working fluid 50 to coiled tubing 18. In particular, fluid source 48 is in fluid communication with a fluid swivel 52 secured to reel 20 and in fluid communication with the interior of coiled tubing 18.

According to one or more embodiments of the present disclosure, working fluid 50 may comprise a polymer including but not limited to those described in U.S. Patent Application Publication No. 2018/0148635 A1, which is hereby incorporated by reference in its entirety. Working fluid 50 may be an aqueous composition including water and said polymer. The aqueous composition may include the polymer in an amount of 0.001 ppt (lb/Mgal) to 1,000 ppt, 0.01 ppt to 1,000 ppt, 0.1 ppt to 500 ppt, 1 ppt to 100 ppt, or 10 ppt to 50 ppt. In any embodiment, the amount of polymer in the aqueous composition may be specifically tailored in view of viscosity requirements and/or expected downhole conditions, e.g., 35 ppt for 200° F., 40 ppt for 250° F., etc. In any embodiment, the aqueous composition may include only water and the polymer. In some embodiments, the aqueous composition does not include a crosslinking agent.

In embodiments of the present disclosure, the working fluid 50 is capable of maintaining particulates in suspension (i.e., remain stable) for prolonged periods of time across a broad range of temperatures. In some embodiments, the working fluid 50 is stable from surface ambient conditions about 30° F. to about 90° F. up to elevated downhole temperatures of about 150° F. to 350° F., e.g., from 30° F. to 350° F. or from 50° F. to 300° F. In some embodiments, the working fluid is stable across the aforementioned temperature ranges for 1 hr or longer, 2 hrs or longer, 5 hrs or longer, 10 hrs or longer, 15 hrs or longer, 24 hrs or longer, 48 hrs or longer, from 1 to 72 hrs, from 5 to 72 hrs, from 10 to 48 hrs, or from 10 to 24 hrs.

According to one or more embodiments, the polymer may include at least one hydrophobic monomer selected from n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and at least one hydrophilic monomer selected from acrylate, acrylate salts, acrylamide, 2-acrylamido-2-methylpropane sulfonic acid, 2-acrylamido-2-methylpropane sulfonic acid salts, and combinations thereof. In an embodiment, the hydrophilic monomers include acrylamide and 2-acrylamido-2-methylpropane sulfonic acid (AMPS). In any embodiment, a terminal end position of the polymer may include a thiocarbonylthio functional group.

In one or more embodiments, the polymer includes a structure represented by formula (A) below:

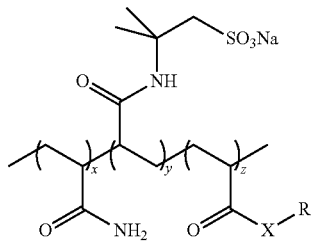

In formula (A) above, each of x, y, and z independently represents an integer from 0 to 100; X represents a functional atom such as O, NH, S, or PH; and R represents an organic group such as a C8 to C24 aliphatic or carbocyclic group. In some embodiments, the aliphatic or carbocyclic group may be substituted or unsubstituted and may be saturated or unsaturated. In some embodiments, the carbocyclic group may be aromatic. In any embodiment, each of x, y, and z may be 0, at least one of x, y, and z may be nonzero, at least two of x, y, and z may be nonzero, or each of x, y, and z may be nonzero. In one or more embodiments, R may represent a C8 to C24 alkyl group such as C12H25. In an embodiment, X is O and R is C12H25 and each of x, y, and z is nonzero.

In one or more embodiments, the polymer may include hydrophilic monomers in an amount, based on a total weight of the polymer, of from 50 wt % to 99.9 wt % or from 80 wt % to 99.9 wt %. In one or embodiments, the polymer may include hydrophobic monomers in an amount, based on a total weight of the polymer, of from 0.01 wt % to 50 wt % or from 0.01 wt % to 20 wt %. In one or more embodiments, the polymer may exhibit a molecular weight of from 10,000 g/mol to 20,000,000 g/mol, from 100,000 g/mol to 10,000,000 g/mol, or from 500,000 g/mol to 5,000,000 g/mol.

In one or more embodiments, the polymer is in a powder form having a particle size of from 5 μm to 800 μm or from 50 μm to 400 μm. In another embodiment, the polymer is in a slurry, which includes a solvent or hydrocarbon phase, and a suspension aiding agent, wherein the particle size of the polymer powder in the slurry ranges from about 5 μm to about 400 μm.

In any embodiment, a breaking additive may be added to the working fluid 50 in order to lower the viscosity thereof and allow any suspended particulates to settle out of the working fluid 50. In one or more embodiments, the breaking additive may be selected from peroxides, persulfates, peracids, bromates, chlorates, chlorides, and combinations thereof. In some embodiments, the breaking additive may include sodium chloride. In some embodiments, the breaking additive may include potassium chloride. In some embodiments, the breaking additive may include a caustic additive that raises the pH of the working fluid 50, such as those available from Halliburton under the trademark MO-67™. In one or more embodiments, the breaking additive may include an acid, e.g. HCl, or acetic acid. The acid may be added to the working fluid 50 in an amount, e.g., based on a total volume of acid and working fluid 50, from 0.0001 vol % to 5 vol %, from 0.001 vol % to 1 vol %, from 0.001 vol % to 0.05 vol %, from 0.001 vol % to 0.005 vol %, or from 0.01 vol % to 1 vol %.

In some embodiments, the breaking additive may be added to the working fluid 50 in the wellbore 12 or at the surface 16 (after completion of CT treatments). When the breaking additive is added in the wellbore 50, the breaking additive may be carried in an analytical tool 80 or an intervention tool 82 or a different chamber inside of the RDT™ or may later be injected into the well, e.g., via fluid source 48. When used, the amount of breaking additive added to the working fluid 50 may be, e.g., based on a total volume of breaking additive and working fluid 50, from 0.0001 vol % to 5 vol %, from 0.001 vol % to 1 vol %, from 0.001 vol % to 0.05 vol %, from 0.001 vol % to 0.005 vol %, from 0.01 vol % to 10 vol %, from 0.1 vol % to 5 vol %, or from 1 vol % to 3 vol %.

In alternative embodiments, the working fluid 50 may be broken by dilution with water, a light brine (i.e., water containing up to 20 wt % of salts), filtered water-based mud (WBM). For example, the working fluid 50 may be diluted with water, light brine, WBM, or a combination thereof by a factor of 1.1, 1.5, 2, 5, 10, or 20. In some embodiments, the working fluid 50 may be diluted with water, light brine, WBM, or a combination thereof until the concentration of polymer in decreased to 5 ppt or less, 3 ppt or less, 1 ppt or less, 0.5 ppt or less, or 0.1 ppt or less. In view of all of the available potential breaking additives, the breaking schedule is flexible and highly predictable as a separate operational step.

In any embodiment, the working fluid 50 may further include an additive including, but not limited to, a salt; a weighting agent; an inert solid; a fluid loss control agent; an emulsifier; a dispersion aid; a corrosion inhibitor; an emulsion thinner; an emulsion thickener; a high-pressure, high-temperature emulsifier-filtration control agent; a surfactant; a lost circulation material; a foaming agent; a gas; a pH control additive; a biocide; a stabilizer; a chelating agent; a scale inhibitor; a mutual solvent; an oxidizer; a consolidating agent; a complexing agent; fluid loss additive; and any combination thereof. In one or more embodiments, the stabilizer may be a clay stabilizer. Without limitation, the clay stabilizer may be included in the working fluid 50 in an amount of greater than 0 gpt (gallons of stabilizer per thousand gallons of working fluid 50) to 20 gpt, 0.5 gpt to 10 gpt, 1 gpt to 5 gpt, or 1 gpt to 3 gpt.

Fluid source 48 may be disposed to provide the working fluid at a select pressure, such as high pressure pumping operation, or may be utilized to adjust the pressure of the pumped fluid. Fluid source 48 may likewise be in communication with other surface equipment 49, such as mixers, blenders and the like, utilized to prepare fluids for pumping downhole via fluid source 48. The CT drilling and production system 10 may also include a power supply 54 and a communications hub 56 for sending signals and/or power and otherwise controlling the CT operations via electric and/or optic cable 23 deployed within coiled tubing 18.

CT drilling and production system 10 may generally be characterized as having a pipe system 58. For purposes of this disclosure, pipe system 58 may include casing, risers, tubing, drill strings, completion or production strings, subs, heads or any other pipes, tubes or equipment that couples or attaches to the foregoing, such as coiled tubing 18, conduit 46, collars, and joints, as well as the wellbore 12 and laterals in which the pipes, casing and strings may be deployed. In this regard, pipe system 58 may include one or more casing strings 60 that may be cemented in wellbore 12, such as the surface, intermediate and production casings 60 shown in FIG. 1. An annulus 62 is formed between the walls of sets of adjacent tubular components, such as concentric casing strings 60 or the exterior of coiled tubing string 18 and the inside wall 62 of wellbore 12 or casing string 60.

A universal CT connector head 70 having one or more cable connectors or terminals (not shown) is attached to the distal end 18a of the coiled tubing 18. A bottom hole assembly (BHA) 72 having one or more cable connectors or terminals (not shown) is likewise attached to connector head 70 to permit BHA 72 to be suspended from coiled tubing 18. CT drilling and production system 10 is utilized to pass a fluid down the flowbore 19 of the coiled tubing 18, through connector head 70 to bottom hole assembly 72. The return fluid will then pass up the annulus 62 formed between coiled tubing 18 and casing string 60 (or inside wall 62 if uncased). Fluids, cuttings and other debris returning to surface 16 from wellbore 12 are directed by a flow line 74 to storage tanks 76 (or fluid source 48) and/or processing systems 78, such as shakers, centrifuges and the like.

BHA 72 generally includes at least one analytic tool 80 and at least one intervention tool 82. In one or more embodiments, the analytic tool 80 is positioned between the connector head 70 and the intervention tool 82. It will be appreciated that in many cases, because of the nature of the tool function (such as milling or drilling), the intervention tool 82 must be positioned at the distal end 72a of the BHA 72. As used herein, analytic tool 80 refers to any type of sensor, observation or measurement device that can be utilized to monitor a condition of the wellbore 12, wellbore fluid or surrounding formation 14. Non-limiting examples of analytic tools 80 include casing collar locators, cement bond tools, cement bond tools, sonic and ultrasonic tools, accelerometers, resistivity tools, nuclear tools, gamma ray tools, flow meters, calipers, cameras, integrated computational elements, fiber optic sensors (such as distributed acoustic sensors), formation testers such as the RDT™, and the like. As used herein, intervention tool 82 refers to any type of tool that modifies the wellbore or materials within it. Non-limiting examples of intervention tools include drill bit, a milling bit, a cleaning tool, a stimulation tool, a fishing tool, a recovery tool, perforating tool, jetting tool, pipe cutters, settable plugs and packers, downhole valves, and the like.

BHA 72 may also include at least one circulating sub 83. In one or more embodiments, BHA 72 may include at least a first circulating sub 83a between the analytic tool 80 and the connector head 70 and a second circulating sub 83b between the analytic tool 80 and the intervention tool 82. In some embodiments, circulating sub 83a is positioned between the connector head 70 and the analytic tool 80 in order to selectively port a working fluid 50 from the inner bore 19 of coiled tubing 18 to the annulus 62 so as to avoid damage to the analytic tool 80 during certain operations. In one or more embodiments, BHA 72 may include an additional pass-through treatment tool 84, such as a jetting tool or clean out tool.

Figure 3:
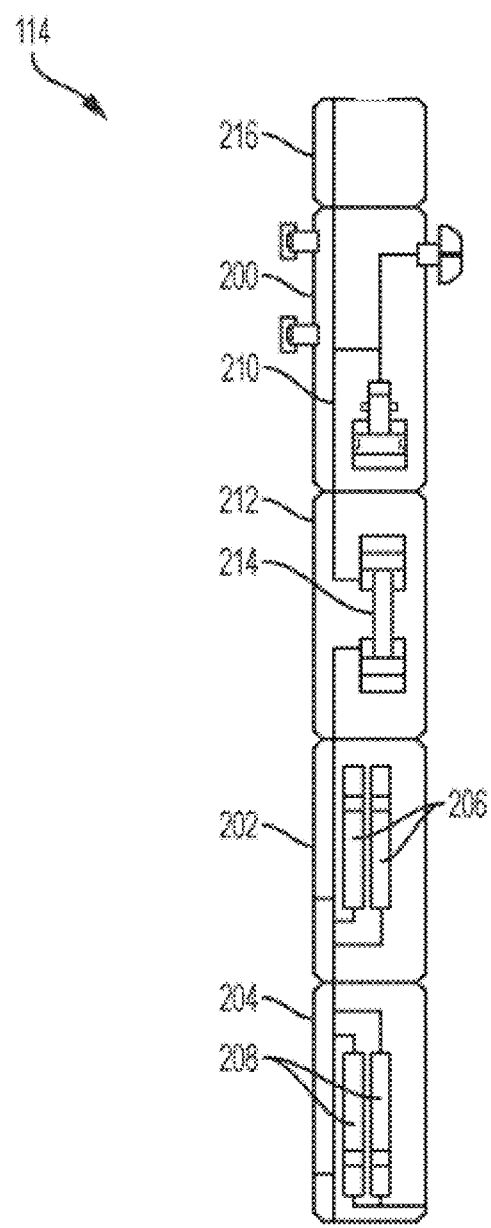
FIG. 3 is a cross-sectional schematic diagram of a formation-tester tool according to an embodiment of the present disclosure.

FIG. 3 is a cross-section schematic diagram of a formation-tester tool. In particular, analytic tool 80 is a formation-tester tool 114 according to one aspect of the present disclosure. The formation-tester tool 114 may include one or more sections, or modules, that may be interconnected to generate a test fracture in the formation 14 and to collect a sample of formation fluid from the wellbore 12 within the formation 14. In some embodiments, the sections may be modular or interchangeable to serve the various purposes of a wellbore operation performed in the wellbore 12. For example, the formation-tester tool 114 may be assembled to include only sections necessary to complete an intended operation in the wellbore 12. In FIG. 3, the formation-tester tool 114 includes a pumping section 200, a fracturing fluid section 202, and a sample collection section 204. The fracturing fluid section 202 may include one or more chambers 206 containing fracturing fluid for use by a pumping device within the pumping section 200 to generate a fracture in a subterranean formation. The fracturing fluid may be the same as working fluid 50 described above and may optionally further include a proppant to prop the fracture open to allow the formation-tester tool 114 to extract formation samples from the subterranean formation through the fracture. The proppant may be included in an amount, based on a total weight of the fracturing fluid, of less than 25 wt %, less than 20 wt %, less than 10 wt %, greater than 0 to less than 25 wt %, greater than 0 to 20 wt %, 5 to 15 wt %, or greater than 0 to 10 wt %.

In some embodiments, the chambers 206 may include a limited amount of fracturing fluid to create a small fracture in the formation 14 and to be pumped into the fracture with proppant. In some embodiments, the chambers 206 may support between 1 and 30 liters of fracturing fluid for performing both operations. The sample collection section 204 may include one or more chambers 208 that may be used to store the sample formation fluid collected from the fracture generated by the formation-tester tool 114.

The pumping section 200, the fracturing fluid section 202, and the sample collection section 204 are hydraulically connected by a feedline 210 that extends through each of the sections 200, 202, 204 to transmit an appropriate fluid between the pumping section 200 and the chambers 206, 208. In some embodiments, the formation-tester tool 114 may also include a control section 212 including a fluid regulator 214 connected to the feedline 210 and configured to route the fluids to an appropriate section of the formation-tester tool 114. For example, the fluid regulator 214 may route fracturing fluid from the chambers 206 of the fracturing fluid section 202 to the pumping section 200 for generating and maintaining the fracture in the subterranean formation. The fluid regulator 214 may route formation fluid sampled from the fracture to the chambers 208 in the sample collection section 204 for storage and analysis. In some embodiments, the fluid regulation device 214 may include one or more pumps or valves operable in conjunction with a pumping device positioned in the pumping section 200 to allow fluid into and out of the formation-tester tool 114. In some embodiments, the formation-tester tool 114 may include additional sections, represented in FIG. 3 by section 216. For example, other sections may include a telemetry section that provides electrical and data communication between the modules and an uphole control unit positioned at the surface 16, a power module that converts electricity into hydraulic power. In another example, section 216 may include a second pump for extracting formation fluid from the formation 14. In an additional example, the section 216 may include a sensor array including one or more sensors for monitoring characteristics of the formation fluid extracted from the formation 14. In some embodiments, the formation-tester tool 114 may exclude an agitation device positioned therein. Although the sections 200, 202, 204, 212, 216 of the formation-tester tool 114 are shown in FIG. 3 in a particular order, the sections may be arranged in any order on the formation-tester tool without departing from the scope of the present disclosure. Moreover, together sections 200, 202, 204, 212, 216 form a tool body 218 of formation-tester tool 114. Finally, while formation-tester tool 114 has been described as discreet sections 200, 202, 204, 212, 216, in one or more embodiments, the different components and features within one or more discreet sections 200, 202, 204, 212, 216 may be integrally formed into tool body 218.

Figure 4:
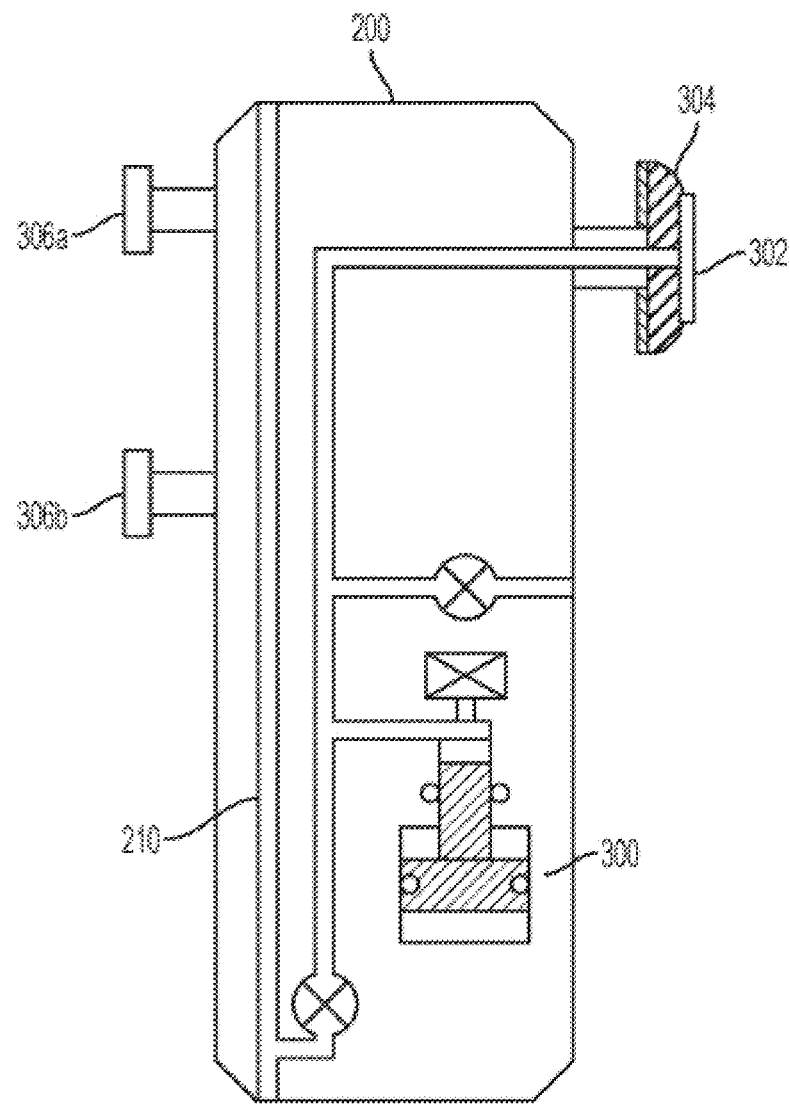
FIG. 4 is a cross-section schematic diagram of a pumping section of the formation-tester tool of FIG. 3.

FIG. 4 is a cross-section schematic of the pumping section 200 of the formation-tester tool 114 shown FIG. 3. The pumping section 200 includes a pump 300. In some embodiments, the pump 300 may include a reciprocating pump. In additional embodiments, the pump 300 may be dual-acting, or double acting. As a double-acting pump, the pump 300 may be able to discharge fracturing fluid from the formation-tester tool 114 via a nozzle 302 in the pumping section 200, as well as create a drawdown pressure to pump formation fluid into the formation-tester tool 114 through the nozzle 302. In some embodiments, the pump 300 may include pumping components positioned in the fluid regulator 214 of the control section 212 of FIG. 3. In some embodiments, the pump 300 may include one or more dual-check valves to allow for fluid flow in multiple directions without allowing fluid to enter an inappropriate chamber (e.g., formation fluid in the chambers 206 of FIG. 3, fracturing fluid in the chambers 208 of FIG. 3).

In conventional micro-frac treatments, filtered WBM is routinely pumped to initiate fractures. According to embodiments of the present disclosure, filtered WBM may be pumped following a micro-frac treatment to break the fracturing fluid and allow flow-back of treating fluids and production of formation fluids without waiting for breaking additives to take effect as is needed with conventional fluids. This process greatly reduces the time needed to produce sufficient formation fluid needed for formation evaluation with the formation-tester tool 114.

According to one or more embodiments, working fluid 50 may be used in a cleanout operation, namely as a cleanout fluid 51. The composition of cleanout fluid 51 may be the same as working fluid 50, as described above.

Figure 5:
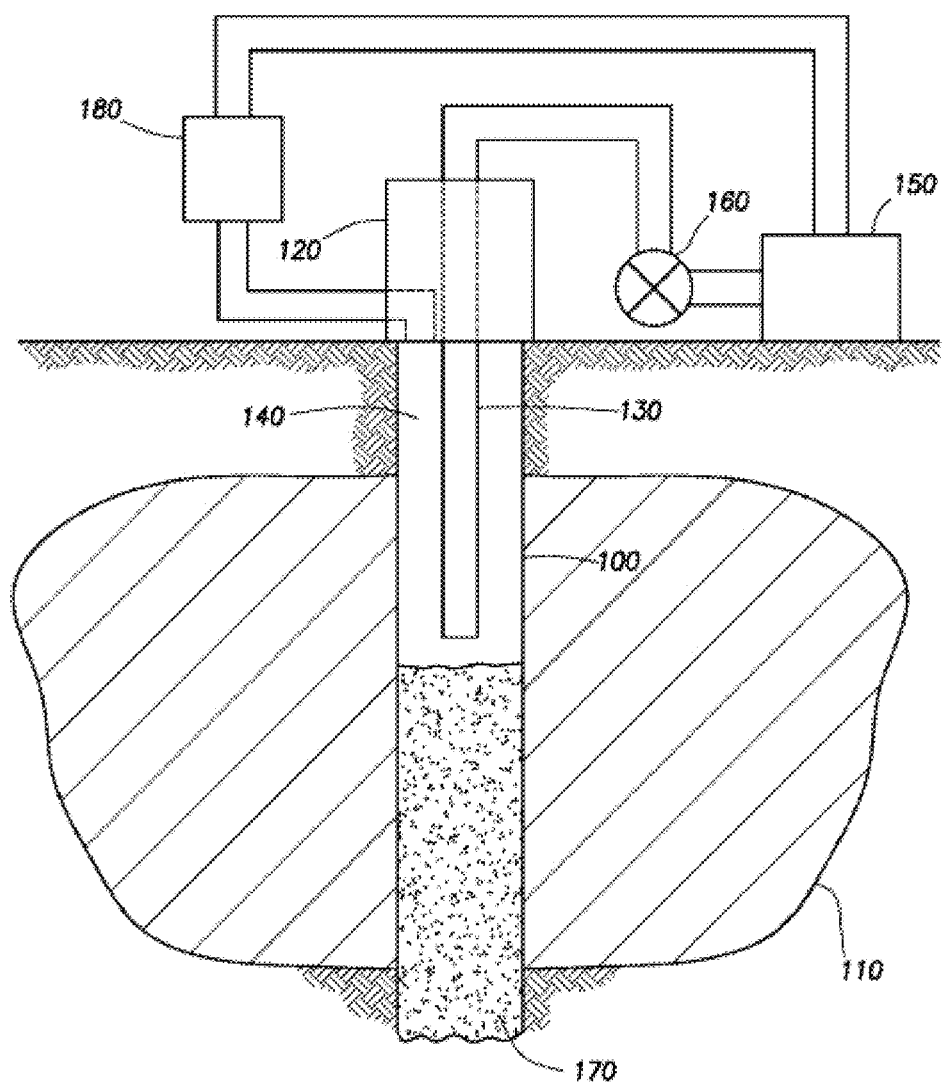
FIG. 5 is a schematic illustration of an example fluid handling system for the preparation and delivery of a cleanout fluid into a wellbore.

FIG. 5 is a schematic illustration of an example fluid handling system for the preparation and delivery of a cleanout fluid into a wellbore. In particular, a wellbore 100 may be disposed into the ground wherein the wellbore 100 penetrates subterranean formation 110. Wellbore 100 may be any kind of wellbore including a straight wellbore, partially deviated wellbore, or fully deviated wellbore. The wellbore 100 may comprise a casing or alternatively, wellbore 100 may be an open hole. While not illustrated, wellbore 100 may comprise perforations, liners, shoes, production casings, and other downhole equipment known in the art. Wellbore 100 may comprise solids 170. The solids 170 may be any solids including, but not limited to, proppant, drill cuttings, sand, scale, crushed portions of the formation, gun debris, formation fines, etc. The solids 170 may partially or fully block the wellbore 100.

As illustrated in FIG. 5, the wellbore 100 is fully blocked which may be the result of a "screen-out" which may be the result of a hydraulic fracturing operation or due to solids entrainment in the produced fluids collecting in the area adjacent to the perforations. The solids 170 may also be entrained in another fluid or fluids. A wellhead 120 may be fluidically connected to wellbore 100 whereby fluids may be conveyed into wellbore 100. Wellhead 120 may comprise a system of spools, valves, and assorted adaptors that provide pressure control of the well and may allow for coiled tubing 130 to be inserted into wellbore 100. Wellhead 120 may provide multiple fluid flow paths including through an annulus 140 formed by wellbore 100 and coiled tubing 130. A fluid handling system 150 may include mobile vehicles, immobile installations, skids, hoses, tubes, fluid tanks or reservoirs, pumps, valves, and/or other suitable structures and equipment. For example, fluid handling system 150 may comprise the cleanout fluid 51 and a pump 160 capable of conveying the cleanout fluid into wellbore 100 through coiled tubing 130. Pump 160 may be a high-pressure pump capable of pumping a fluid at about 10,000 psi or more. Fluid handling system 150 and pump 160 may be configured to convey the cleanout fluid 51 into wellbore 100 through coiled tubing 130 and out of wellhead 120 by means of the annulus 140. In an alternative example not illustrated, fluid handling system 150 and pump 160 may be configured to convey the cleanout fluid 51 into wellbore 100 though annulus 140 and out of wellhead 120 by means of coiled tubing 130. Fluid handling system 150 may comprise a coiled tubing truck for onshore applications, or in offshore applications, a coiled tubing skid.

With further reference to FIG. 5, a cleaning system 180 may be present for cleaning the cleanout fluid 51 to, for example, remove entrained solids from the fluid. The cleaning system 180 may comprise, without limitation, a series of screens, meshes, shale shakers, flocculating tanks, filters, chemicals, and other means known in the art to separate entrained solids from the fluid. The cleaning system 180 may, for example, substantially remove all of the entrained solids in the cleanout fluid 51. In another example, the cleaning system may remove only a selected size range of entrained solids. Fluid handling system 150 may be configured to recycle the cleanout fluid 51. As discussed above, the cleanout fluid may be conveyed into wellbore 100 by means of coiled tubing 130 or annulus 140. In either embodiment, fluid handling system 150 may be configured to recycle the cleanout fluid by providing a closed fluid path for the cleanout fluid 51 to flow. In one or more embodiments, the cleanout fluid 51 may be conveyed into wellbore 100 through coiled tubing 130 and then flow through annulus 140 to wellhead 120, into cleaning system 180 wherein the entrained solids may be removed and then to fluid handling system 150. The cleaned cleanout fluid 51 may be re-conveyed into wellbore 100 thereby completing the closed fluid flow path. In another embodiment, the cleanout fluid 51 may be conveyed into wellbore 100 through annulus 140 and then flow through coiled tubing 130 to wellhead 120 and into fluid handling system 150 and then into cleaning system 180 wherein the entrained solids may be removed. The cleaned cleanout fluid 51 may be re-conveyed into wellbore 100 thereby completing the closed fluid flow path. By recycling the cleanout fluid 51, the costs of cleaning the wellbore may be reduced as less cleanout fluid 51 may be needed. In another example, the cleanout fluid 51 may not be recycled. The cleanout fluid 51 may be conveyed out of wellbore 100 and into a retention pit which is not illustrated.

With further reference to FIG. 5, fluid handling system 150 may further comprise a means for mixing the cleanout fluid 51. The means for mixing may comprise storage tanks, mixing vessels, conveying systems, and control systems to mix the cleanout fluid 51 on demand to a pre-designed recipe or mixture. In another embodiment, the cleanout fluid 51 may be mixed off-site at a preparation location and transported to the well-site. The pre-prepared cleanout fluid 51 may be conveyed into fluid handling system 150 by means of a supply line.

Figure 6A:
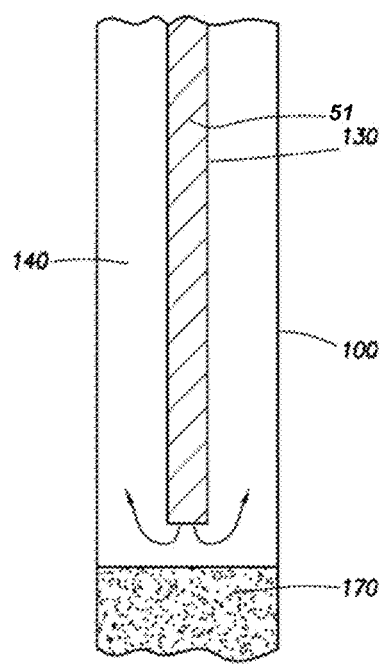
FIGS. 6A-6E are schematic illustrations of an example method of using a cleanout fluid.
Figure 6B:
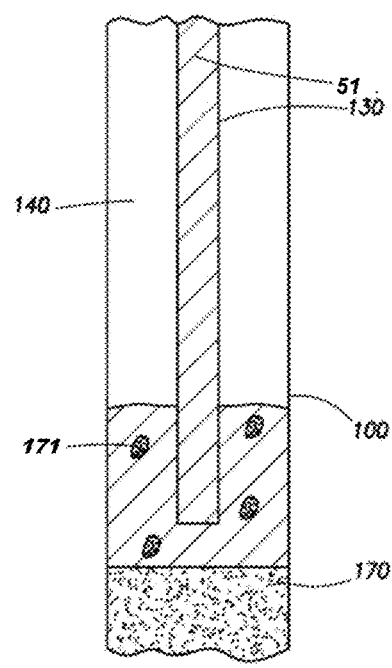
Figure 6C:
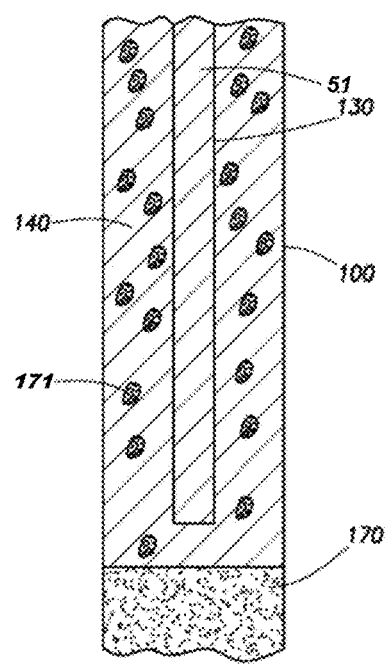
Figure 6D:
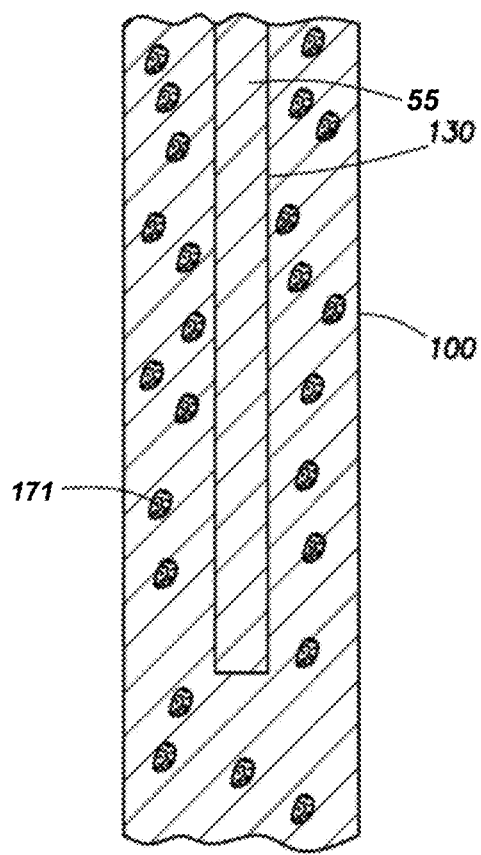
Figure 6E:
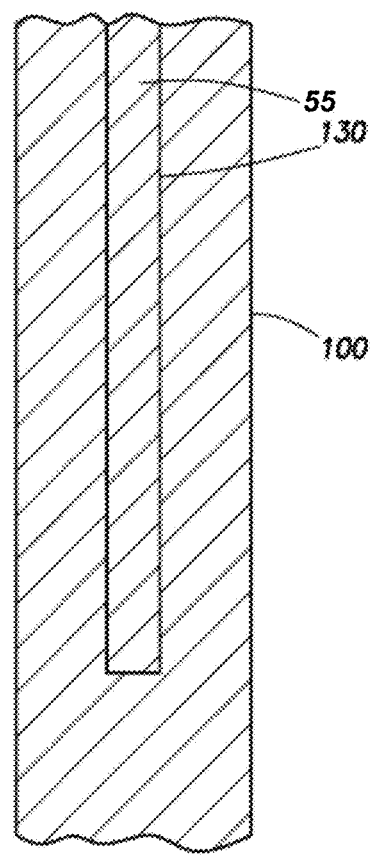

FIGS. 6A-6E are schematic illustrations of an example method of using a cleanout fluid. Referring now to FIG. 6A, in one or more embodiments, the cleanout fluid 51 may be conveyed into wellbore 100 through coiled tubing 130. Again annulus 140, in this embodiment, is defined by the space between wellbore 100 and coiled tubing 130. Solids 170 may be present in the wellbore 100. As illustrated, cleanout fluid 51 may flow down coiled tubing 130 and up annulus 140. With reference to FIG. 6B, cleanout fluid 51 may contact solids 170 and may entrain some particles of solids 170. The entrained solid particles 171 may be substantially trapped in the cleanout fluid 51 wherein the entrained solid particles 171 should not tend to migrate downwards once entrained. The cleanout fluid 51 may flow up annulus 140 to wellhead 120 as previously illustrated in FIG. 5. Entrained solid particles 171 may follow the flow path of the bulk fluid and may be transported by cleanout fluid 51 to wellhead 120. As cleanout fluid 51 entrains solids 170, the total volume of solids 170 in wellbore 100 may decrease. With reference to FIG. 6C, as the total volume of solids 170 may decrease, coiled tubing 130 may be extended further into wellbore 100. Extending coiled tubing 130 may allow cleanout fluid 51 to further contact remaining solids 170. With reference to FIGS. 6D and 6E, after a given time, cleanout fluid 51 may have entrained substantially all solid 170 in wellbore 100. A spacer fluid 55 may be conveyed though coiled tubing 130 to displace cleanout fluid 51 and entrained solid particles 171. Spacer fluid 55 may be any kind of fluid. For example, without limitation, a drilling mud, fracturing fluid, weighted fluid, or any other fluid that may displace cleanout fluid 51 and entrained solid particles 171.

In some examples, with additional reference to FIG. 5, the cleanout fluid 51 may be conveyed into wellbore 100 through coiled tubing 130 and allowed to flow through annulus 140 and back into fluid handling system 150. The cleanout fluid 55 may then have entrained solid particles 171 removed before being conveyed by pump 160 back into wellbore 100. In another example, the cleanout fluid 51 may be conveyed down through the annulus 140 and flow up through the fluid handling system 150.

EXAMPLES

Example 1

Figure 7:
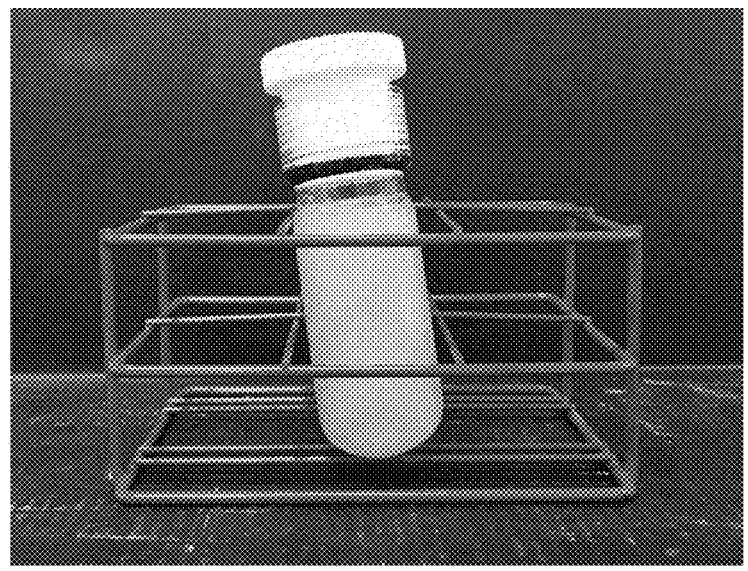
FIG. 7 is a photograph of the suspension prepared in Example 1 after storage at 200° F. for 24 hours.

A fluid composition was prepared by hydrating 0.72 g of an acrylamide ester polymer including a structure according to formula (A) with 200 mL water for 5 minutes. 12 g sand was then added under vigorous mixing. The fluid composition was stored at 200° F. for 24 hours. As shown in FIG. 7, the fluid composition did not break (i.e., sand particles remained suspended) at elevated temperatures for an extended period of time.

Example 2

Figure 8:
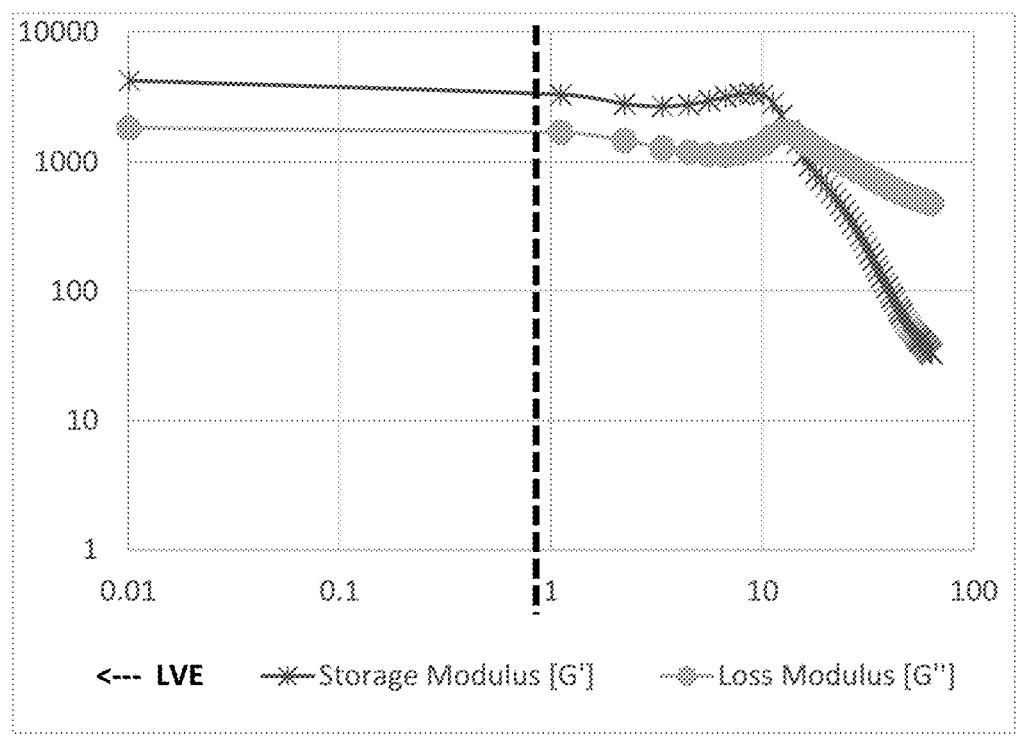
FIG. 8 is a graph showing the amplitude sweep measured in Example 2.

A fluid composition was prepared in the same manner as in Example 1 above except that the concentration of polymer was 40 ppt and without sand. The fluid composition was placed into a double gap geometry rheometer and an oscillatory amplitude sweep was conducted at room temperature. The results are shown in FIG. 8. Even though the fluid composition is a single-component mixture (i.e., one component other than water) without any crosslinker, the fluid exhibited a high storage modulus (G') which contributes to the fluids extraordinary suspension capabilities. In FIG. 8, the linear viscoelastic region ("LVE region") is shown as the region to the left of dotted line LVE.

Example 3

Figure 9:
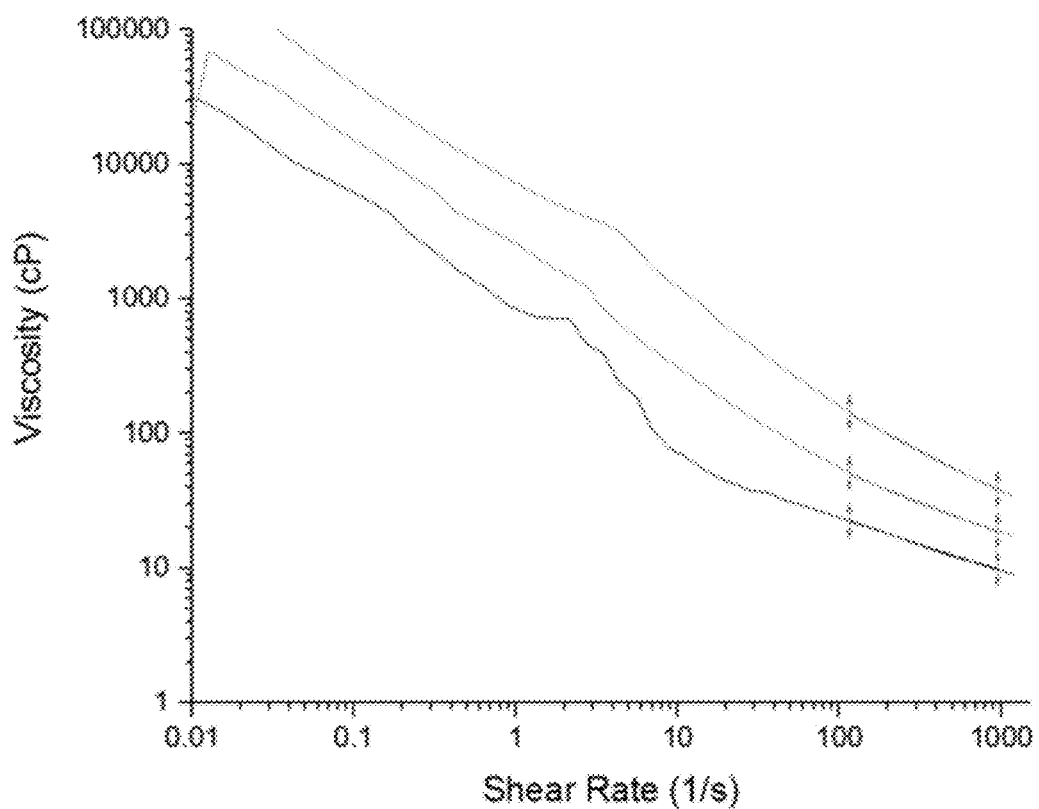
FIG. 9 is a graph showing viscosity curves generated in Example 3.

Three fluid compositions were prepared in the same manner as in Example 2 above, except that the polymer compositions were present in concentrations 4 ppt, 8 ppt, and 16 ppt, respectively. Viscosity curves were prepared for each of these fluid compositions at room temperature, and the results are shown in FIG. 9. The top line in FIG. 9 is the 16 ppt composition, the middle line is the 8 ppt composition, and the bottom line is the 4 ppt composition. As shown in FIG. 9, the fluid compositions according to the present disclosure can be precisely tailored to provide predictable viscosity profiles. Moreover, conventional crosslinked working or fracturing fluids that a viscosity of about 1,000-10,000 cP at room temperature at 100 $s^{-1}$ when fully crosslinked. On the other hand, the fluids shown in FIG. 9 are much less viscous, which allows for easier injection of the fluid into a wellbore.

Example 4

Figure 10:
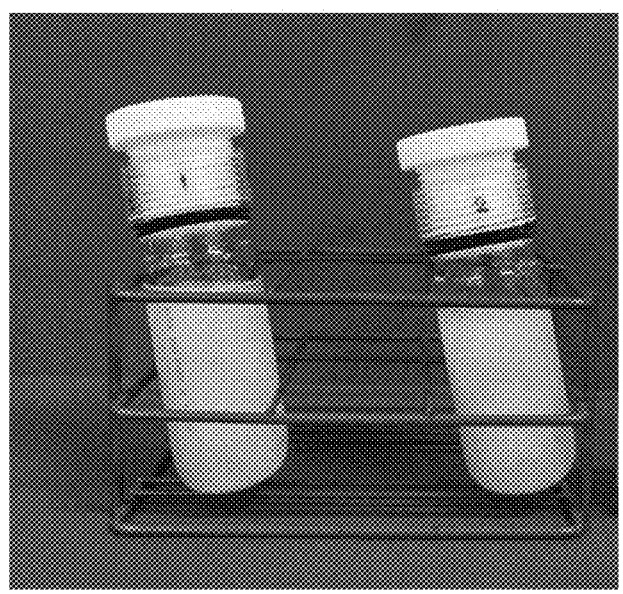
FIG. 10 is a photograph showing the suspension prepared in Example 4 after storage at 250° F. for 15 hours.

Two fluid compositions were prepared in the same manner as in Example 1 except that the polymer concentration was 40 ppt for each composition. The compositions were stored at 250° F. for 15 hours. The fluid compositions after storage are shown in FIG. 10. Even at elevated temperatures, sand particles remained suspended in the fluid compositions.

Example 5

Figure 11:
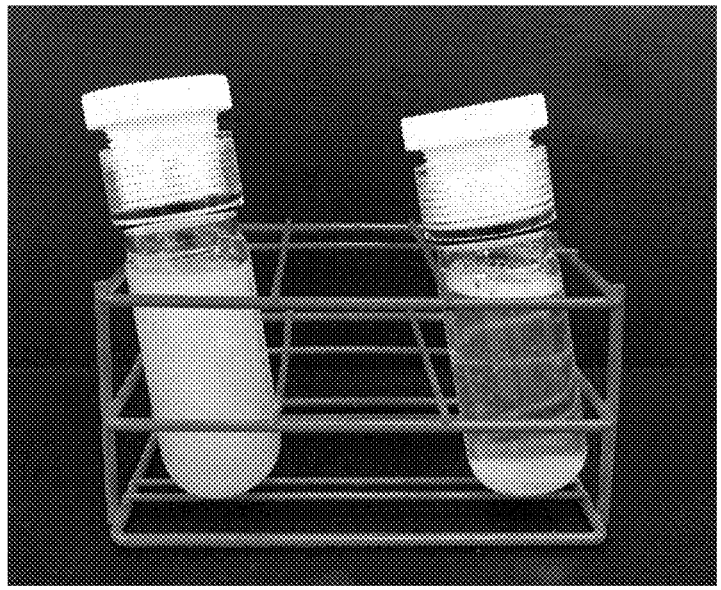
FIG. 11 is a photograph showing a suspension after storage at 200° F. for 6 hours and a broken fluid after storage at 200° F. for 6 hours followed by addition of a breaking additive prepared in Example 5.

Two fluid compositions were prepared in the same manner as Example 1 and stored at 200° F. for 6 hrs. Thereafter, a 10% NaCl solution was added to one of the fluid compositions. As shown in FIG. 11, which depicts a photo taken 30 minutes after addition of NaCl, the fluid composition on the left (without NaCl) maintained the sand particles in suspension while the fluid composition on the right was entirely broken after addition of NaCl.

Example 6

Figure 12:
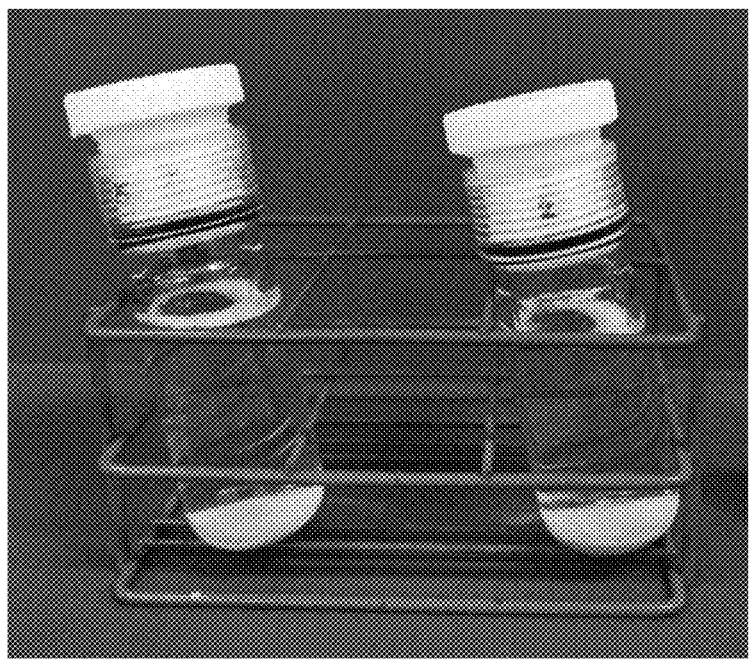
FIG. 12 is a photograph of the broken fluids prepared in Example 6 after storage at 250° F. for 2 hours followed by addition of a breaking additive.

Two fluid compositions were prepared in the same manner as in Example 1 except that the polymer concentration was 40 ppt for each fluid composition. 2 ml of caustic additive (MO-67™) was added to each 100 ml fluid composition and the resultant mixtures were stored at 200° F. for 2 hours. As shown in FIG. 12, a small addition of the caustic additive was able to completely break the fluids within very short time and cause sand particles to fall out of suspension.

Example 7

Figure 13:
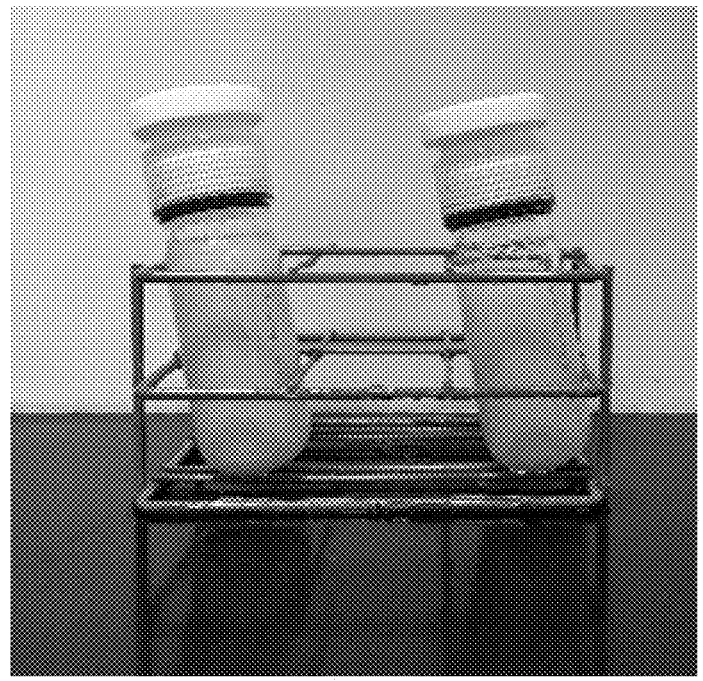
FIG. 13 is a photograph showing suspensions prepared in Example 7 after storage at 200° F. for 2 hours.
Figure 14:
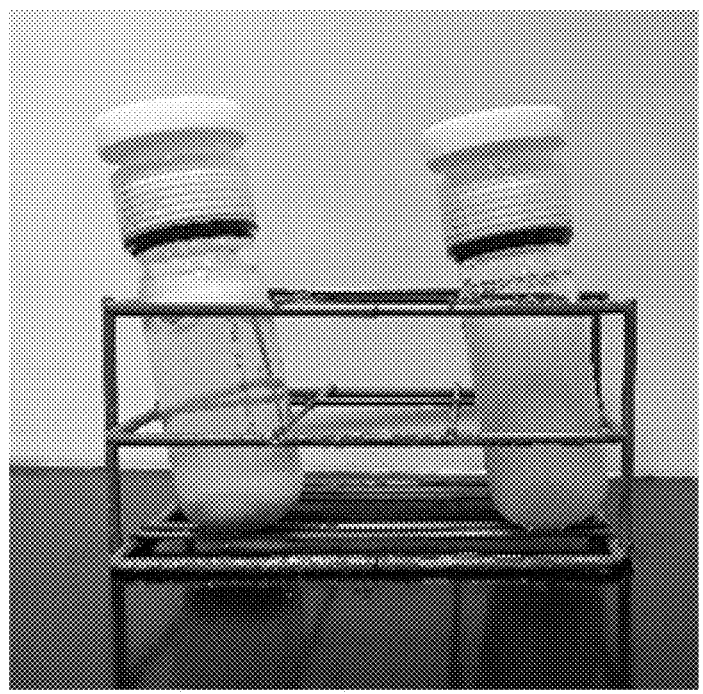
FIG. 14 is a photograph showing the fluids prepared in Example 7 after storage at 200° F. for 20 hours.

A first fluid composition was prepared by hydrating 0.48 g of the polymer used in Example 1 in 200 mL of water (polymer concentration of 20 ppt) in the presence of 0.2 mL (1 gpt) of a clay stabilizer (available from Halliburton Energy Services under the tradename ClayFix II™). After hydration, 24 g of sand (100 mesh) was added under vigorous agitation. A second fluid was prepared in the same manner as the first fluid except that 0.4 mL (2 gpt) of an acid (available from Halliburton Energy Services under the tradename BA-20L™) was added to the second fluid during hydration. FIG. 13 shows the first fluid on the right and the second fluid on the left after storage at 200° F. for 2 hours. As shown in FIG. 13, both fluids maintained the sand particles in suspension. FIG. 14 shows the same fluids after 20 hours at 200° F. As seen in FIG. 14, the addition of an acid to the second fluid caused a delayed breaking of the fluid, whereas the first fluid maintained the sand particles in suspension.

Example 8

A fluid composition was prepared by hydrating 0.48 g of the polymer used in Example 1 in 200 mL of water (polymer concentration of 20 ppt) in the presence of 0.2 mL (1 gpt) of ClayFix II™ and 0.1 mL (0.5 gpt) 15% HCl. After hydration, 24 g of sand (100 mesh) was added under vigorous agitation. The composition was kept in 200° F. and showed stability around 5 hours. The fluid broke completely after 18 hours. The addition of 0.5 gpt 15% HCl to the fluid offered a delayed breaking of the fluid.

Thus, a method of servicing a wellbore has been described. Embodiments of the method include deploying a wireline tool and an intervention tool on coiled tubing into a wellbore; and pumping a first fluid along a flow path through the wireline tool to the intervention tool. In some embodiments, the first fluid includes a polymer including: at least one hydrophobic monomer selected from the group consisting of n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and at least one hydrophilic monomer selected from the group consisting of acrylate, acrylate salts, acrylamide, 2-acrylamido-2-methylpropane sulfonic acid, 2-acrylamido-2-methylpropane sulfonic acid salts and combinations thereof. In some embodiments, the first fluid does not comprise a crosslinker. In some embodiments, the polymer includes a structure according to formula (A) described herein. Some embodiments of the method may include utilizing a second fluid that is different from the first fluid and may be water containing up to 10 vol % of salts, filtered water-based mud, or a caustic additive.

For the foregoing embodiments, the method may include any one of the following steps, alone or in combination with each other:

Utilizing the intervention tool to perform a task selected from the group consisting of perforating wellbore casing, milling wellbore casing, drilling a wellbore, and drilling a plug; and Contacting a second fluid with the first fluid, wherein the second fluid is different from the first fluid.

Thus, a coiled tubing system for performing operations in a wellbore has been described. Embodiments of the system include: coiled tubing forming an inner flow bore and having a distal end; a connector head attached to the distal end of the coiled tubing; an analytic tool secured to the connector head; and a first intervention tool secured to the analytic tool. In some embodiments, the analytical tool comprises a first chamber that contains a first fluid including a polymer including: at least one hydrophobic monomer selected from the group consisting of n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth) acrylamide, oleyl (meth)acrylate, oleyl (meth)acrylamide, erucyl (meth)acrylate, erucyl (meth)acrylamide, and combinations thereof; and at least one hydrophilic monomer selected from the group consisting of acrylate, acrylate salts, acrylamide, 2-acrylamido-2-methylpropane sulfonic acid, 2-acrylamido-2-methylpropane sulfonic acid salts and combinations thereof. In some embodiments, the polymer includes a structure according to formula (A) described herein.

Any of the foregoing embodiments, may include any one of the following elements, alone or in combination with each other:

The analytical tool further includes a second chamber containing a second fluid that is different from the first fluid;

The second fluid is water containing up to 10 vol % of salts or a caustic additive;

The first fluid is only water and the polymer;

The first fluid does not include a crosslinker;

The first fluid includes a clay stabilizer; and

Therein the polymer is present in the first fluid in an amount of from 1 ppt to 100 ppt (lb/Mgal).

Thus, a formation-tester tool has been described. Embodiments include one or more chambers positioned in a first section of the formation-tester tool and housing a first fluid; a nozzle positionable proximate to an uncased wall of an open-hole wellbore adjacent to an area of interest of a subterranean formation including a reservoir; and a pump positioned in a second section of the formation-tester tool, the pump being in hydraulic communication with the one or more chambers by a feedline extending between the first section and the second section to inject the first fluid from the one or more chambers into a test fracture of the area of interest of the subterranean formation, wherein the pump is further in fluid communication with the nozzle via the feedline to retrieve a fluid sample from the reservoir within the area of interest by creating a drawdown pressure in the test fracture through the nozzle and storing the fluid sample in one or more additional chambers positioned in a third section of the formation-tester tool. In some embodiments, the first fluid includes a polymer including: at least one hydrophobic monomer selected from the group consisting of n-hexyl (meth)acrylate, n-octyl (meth)acrylate, octyl (meth) acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and at least one hydrophilic monomer selected from the group consisting of acrylate, acrylate salts, acrylamide, 2-acrylamido-2-methylpropane sulfonic acid, 2-acrylamido-2-methylpropane sulfonic acid salts and combinations thereof. In some embodiments, the polymer includes a structure according to formula (A) described herein.

Any of the foregoing embodiments, may include any one of the following elements, alone or in combination with each other:

The first fluid further comprises a proppant suspended therein;

The tool includes at least first and second chamber positioned in the first section, the first chamber housing the first fluid and the second chamber housing a second fluid that is different from the first fluid; and The second fluid is water containing up to 10 vol % of salts or a caustic additive.

Thus, a method of preforming wellbore cleanout has been described. Embodiments of the method include: introducing a cleanout fluid into a wellbore, the wellbore having particulate matter disposed therein; and entraining at least a portion of the particulate matter within the cleanout fluid. The cleanout fluid includes a polymer including: at least one hydrophobic monomer selected from the group consisting of n-hexyl (meth)acrylate, n-octyl (meth)acrylate, octyl (meth) acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and at least one hydrophilic monomer selected from the group consisting of acrylate, acrylate salts, acrylamide, 2-acrylamido-2-methylpropane sulfonic acid, 2-acrylamido-2-methylpropane sulfonic acid salts and combinations thereof. In some embodiments, the particulate matter includes proppant, drill cuttings, sand, scale, crushed portions of the formation, gun debris, or formation fines. In some embodiments, the wellbore further includes a coiled tubing, wherein an annulus is defined by a region of space between an inner diameter of the wellbore and an outer diameter of the coiled tubing; and the cleanout fluid may be introduced into the wellbore through the coiled tubing or the cleanout fluid may be introduced into the wellbore through the annulus.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. A method of servicing a wellbore, comprising:
introducing a first fluid into a wellbore, the wellbore having particulate matter disposed therein; and
entraining at least a portion of the particulate matter within the first fluid;
wherein the first fluid includes a polymer comprising:
at least one hydrophobic monomer selected from the group consisting of n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and
at least one hydrophilic monomer selected from the group consisting of acrylate, acrylate salts, acrylamide, 2-acrylamido-2-methylpropane sulfonic acid, 2-acrylamido-2-methylpropane sulfonic acid salts and combinations thereof;
wherein the polymer includes a structure according to the following formula (A):

wherein the polymer includes a structure according to the following formula (A):

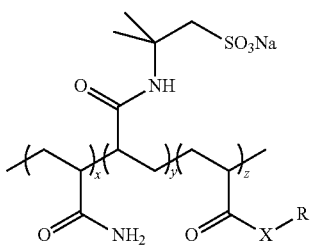

wherein each of x, y, and z independently represents an integer from 0 to 100; X represents O, NH, S, or PH; and R represents a C8 to C24 aliphatic or carbocyclic group.

2. The method according to claim 1, wherein the particulate matter comprises proppant, drill cuttings, sand, scale, crushed portions of the formation, gun debris, or formation fines.

3. The method according to claim 1, further comprising introducing the first fluid into the wellbore through coiled tubing.

4. The method according to claim 1, further comprising pumping the first fluid along a flow path through a wireline tool to an intervention tool deployed in the wellbore; and further comprising utilizing the intervention tool to perform a task selected from the group consisting of perforating wellbore casing, milling wellbore casing, drilling a wellbore, and drilling a plug.

5. The method according to claim 1, further comprising contacting a second fluid with the first fluid, wherein the second fluid is different from the first fluid.

6. The method according to claim 5, wherein the second fluid is selected from the group consisting of water containing up to 10 vol % of salts, filtered water-based mud, and a caustic additive.

7. The method according to claim 1, wherein the first fluid further comprises at least an acid or a clay stabilizer.

8. The method according to claim 1, wherein the first fluid does not comprise a crosslinker.

9. A coiled tubing system for performing operations in a wellbore, the coiled tubing system comprising:
   coiled tubing forming an inner flow bore and having a distal end;
   a connector head attached to the distal end of the coiled tubing;
   an analytic tool secured to the connector head; and
   a first intervention tool secured to the analytic tool,
   wherein the analytical tool comprises a first chamber that contains a first fluid including a polymer comprising:
      at least one hydrophobic monomer selected from the group consisting of n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and
      at least one hydrophilic monomer selected from the group consisting of acrylate, acrylate salts, acrylamide, 2-acrylamido-2-methylpropane sulfonic acid, 2-acrylamido-2-methylpropane sulfonic acid salts and combinations thereof;
   wherein the polymer includes a structure according to the following formula (A):

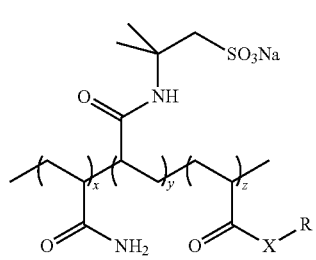

wherein each of x, y, and z independently represents an integer from 0 to 100; X represents O, NH, S, or PH; and R represents a C8 to C24 aliphatic or carbocyclic group.

10. The system according to claim 9, wherein the analytical tool further comprises a second chamber containing a second fluid that is different from the first fluid.

11. The system according to claim 10, wherein the second fluid is water containing up to 10 vol % of salts or a caustic additive.

12. The system according to claim 9, wherein the first fluid consists of water and the polymer.

13. The system according to claim 9, wherein the first fluid further comprises a clay stabilizer.

14. The system according to claim 9, wherein the first fluid does not include a crosslinker.

15. The system according to claim 9, wherein the polymer is present in the first fluid in an amount of from 1 ppt to 100 ppt.

16. A formation-tester tool, comprising:
   a tool body;
   a first chamber and a second chamber each formed within the tool body, the first chamber housing a first fluid and the second chamber housing a second fluid different from the first fluid;
   a nozzle positioned along the tool body; and
   a pump positioned within the tool body, the pump being in fluid communication with the first chamber and the nozzle by a feedline
   wherein the first fluid includes a polymer comprising:
      at least one hydrophobic monomer selected from the group consisting of n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and
      at least one hydrophilic monomer selected from the group consisting of acrylate, acrylate salts, acrylamide, 2-acrylamido-2-methylpropane sulfonic acid, 2-acrylamido-2-methylpropane sulfonic acid salts and combinations thereof;
   wherein the polymer includes a structure according to the following formula (A):

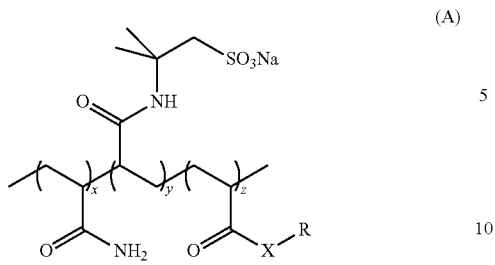

(A)

wherein each of x, y, and z independently represents an integer from 0 to 100; X represents O, NH, S, or PH; and R represents a C8 to C24 aliphatic or carbocyclic group.

17. The tool according to claim 16, wherein the second fluid is water containing up to 20 vol % of salts or a caustic additive and wherein the first fluid further comprises a proppant suspended therein, the proppant being present in an amount of less than 20 wt % based on a total weight of the first fluid.

* * * * *